April 17, 1962   C. D. GOOD ET AL   3,030,289
METHOD FOR THE PREPARATION OF SYM-TRIBORADIMETHYNE
Filed Sept. 16, 1959
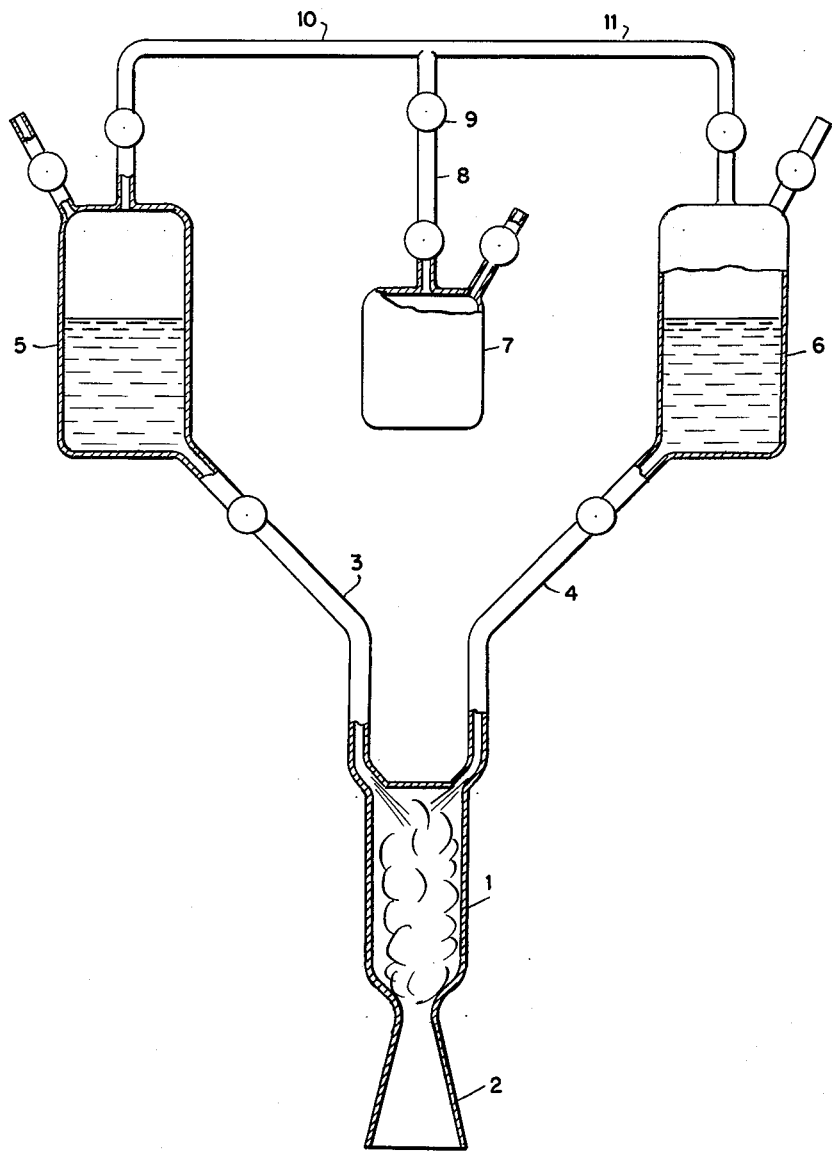
Carl D. Good
Robert E. Williams
INVENTORS
BY
Adams, Forward & McLean
ATTORNEYS 3,030,289
Patented Apr. 17, 1962

3,030,289
METHOD FOR THE PREPARATION OF SYM-TRIBORADIMETHYNE
Carl D. Good, Seattle, Wash., and Robert E. Williams, Pasadena, Calif., assignors to Olin Mathieson Chemical Corporation, a corporation of Virginia
Filed Sept. 16, 1959, Ser. No. 840,468
1 Claim. (Cl. 294—168)

This invention relates to a new chemical compound, symmetrical triboradimethyne ($B_3C_2H_5$), and to a method for its preparation.

The new chemical compound of this invention is symmetrical triboradimethyne. It has the empirical formula $B_3C_2H_5$ and in its normal state is a colorless gas. Four melting point determinations indicate that the melting point of sym-triboradimethyne is $-126.40 \pm 0.05°$ C. Vapor pressure determinations over the range $-13.5$ to $-95.65 \pm 0.02°$ C. can be expressed by the equation $$\log_{10} P = 8.6842 - \frac{1410}{T} - 0.0021T$$

where P is pressure in millimeters of mercury and T is degrees Kelvin. Extrapolation of the data obtained in this range indicates that the normal boiling point of sym-triboradimethyne is $-4.0°$ C. Symmetrical triboradimethyne is useful as a high energy fuel for rocket engines.

Symmetrical triboradimethyne is prepared by subjecting an admixture of pentaborane (9) and acetylene to a silent electric discharge and separating symmetrical triboradimethyne from the reaction mixture. Advantageously the mixture comprises from 0.1 to 10 moles of pentaborane (9) per mole of acetylene and the reaction is carried out at a temperature within the range from 0° C. to 100° C. and a pressure within the range from 10 mm. Hg to 760 mm. Hg.

The preparation of symmetrical triboradimethyne is illustrated in detail by the following example.

*Example*

In this example a silent discharge reactor unit was employed which consisted of two coaxial Pyrex tubes approximately one meter long with an annular separation between inner and outer tubes of approximately 2 mm. The tube walls were approximately 1 mm. thick. The inside tube contained a saturated aqueous solution of copper sulfate which served as one electrode. The other electrode was brass foil wrapped around the outer tube. A 15,000 volt transformer connected to the electrodes served as a high voltage source. The reactor unit was connected into a closed system also containing an all-glass mganetically operated pump, three cold traps, and a mercury manometer.

A 1:1 mixture of pentaborane (9) and acetylene (25 millimoles each) was circulated through the silent discharge reactor unit at an initial pressure of about 200 mm. Hg and at room temperature. The reaction was continued for about one hour. During this period the total pressure in the system gradually decreased to about 170 mm. Hg, a light yellow-brown deposit formed on the walls of the reactor unit, and the temperature increased noticeably to about 40° C. The high voltage source was then disconnected, liquid nitrogen baths ($-196°$ C.) were placed on all of the cold traps, and circulation of the gases was continued for approximately one-half hour in order to remove all condensable gases from the system. At the end of this time, the non-condensable materials were pumped off and the products condensable at $-196°$ C. were transferred to the fractionation train of a high vacuum apparatus.

The material condensable at $-196°$ C. was fractionated at $-140°$ C. using a cold temperature bath of Freon-12. The material not condensable at $-140°$ C. was chiefly unreacted acetylene (mass spectral analysis). Further fractionation of the less volatile material at $-115°$ C. yielded a small non-condensable fraction (0.037 millimole) which proved, by mass spectral analysis, to consist mainly of sym-triboradimethyne.

Several other experiments to prepare sufficient quantities of sym-triboradimethyne for physical investigation were performed in a similar manner. The crude sym-triboradimethyne so obtained was purified further by several fractionations at $-126°$ C. to remove less volatile impurities, and by fractionation at $-132$ to $-135°$ C. to remove more volatile hydrocarbon impurities. It was very difficult to remove traces of biacetylene (identified by comparison with the infrared spectrum of pure biactylene) from the compound by means of fractional condensation. When the compound was allowed to stand for a number of weeks at ambient temperature, however, the biacetylene disappeared completely, probably by polymerization. The purity of the sym-triboradimethyne was determined during successive stages of purification by means of its infrared spectrum.

Sym-triboradimethyne was contacted with acetone, trimethylamine, carbon dioxide, air and water at room temperature without noticeable reaction. Essentially no decomposition of sym-triboradimethyne even on prolonged storage at room temperature has been observed. An exchange reaction occurs with $B_2D_6$ at room temperature by which hydrogens attached to boron are replaced by deuterium.

Interpretation of the mass spectrum and nuclear magnetic resonance spectra of sym-triboradimethyne determined the empirical formula to be $B_3C_2H_5$.

A comparison of the mass spectrum of isotopically normal sym-triboradimethyne with that of an isotopically-enriched sample (96 percent $B^{10}$) shows a shift of the peaks typical of a molecule with three boron atoms. The polyisotopic spectrum reduces to the monoisotopic spectrum with negligible residues when three boron atoms are assumed, and the value of the $m/e$ 63 peak caused by the $C^{13}$ isotope in normal carbon is in agreement with two carbons per molecule. When the polyisotopic mass spectrum of sym-triboradimethyne is compared with typical examples of other classes of compounds, the fragmentation pattern is similar to that of benzene. Both benzene and sym-triboradimethyne apparently lose only hydrogen atoms to form the majority of their fragments and only seldom does the molecular skeleton break up to produce fragments. On the other hand, the pure boranes and the saturated hydrocarbons show considerable skeletal fragmentation. This tendency of sym-triboradimethyne to retain the skeletal structure is characteristic of aromatic or other compounds stabilized by resonance.

The nuclear magnetic resonance spectrum of a small quantity of sym-triboradimethyne was examined and the proton spectrum shows that there are two kinds of protons in the molecule, some connected to identical carbons and others connected to identical borons; the spectrum is consistent with two C-H units and three B-H units. The boron spectrum shows that all the borons are identical and to have only one proton per boron. A molecular structure consisting of three equal B-H units and two equal C-H units is necessary; consequently, an upper limit of five protons per molecule is established. The extreme sharpness of the boron spectrum indicates a high order of symmetry.

Sym-triboradimethyne has also been detected in mass spectral data of the products of the thermal reaction of diborane with acetylene. These products were obtained by condensing a sufficient quantity of borane to give a pressure of 100–200 mm. of mercury at room temperature into a 500-ml. bulb equipped with a break-off tip. The same amount of acetylene was then condensed. The tip was sealed off and the bulb warmed to room temperature, then heated in an oil bath until deposition of solid occurred (temperature 100–125°). The bulb was then cooled in liquid nitrogen, sealed to the vacuum system and opened. Hydrogen was pumped out through a trap cooled with liquid nitrogen and the condensable components were fractionated through a series of cold baths (0°, −23°, −45°, −63°, −80°, −110°, −124° and −200°). Each fraction was collected in a break-off tube and analyzed mass spectrometrically. The sym-triboradimethyne was detected in the −124° C. fraction.

The operation of a rocket engine employing a bipropellant consisting of liquid oxygen and symmetrical triboradimethyne will be described with reference to the accompanying drawing, which depicts schematically a conventional rocket engine.

In the drawing, numeral 1 represents the reaction chamber and numeral 2 the nozzle of the rocket engine. Chamber 1 is connected by valved lines 3 and 4 to vented tanks 5 and 6, respectively, which contain the oxygen and triboradimethyne propellants. Tank 7 contains, for example, a compressed inert gas such as nitrogen and is connected by line 8, containing pressure regulator 9, and branched valved lines 10 and 11, respectively, to tanks 5 and 6. Reaction chamber 1 is generally quite small in comparison with the size of the propellant tanks 5 and 6. The pressure in reaction chamber 1 during the reaction can be controlled by the rate of addition of the propellants and is generally in the range of 300–1000 p.s.i.a. The propellants are forced into reaction chamber 1 against this pressure and the compressed inert gas from tank 7 is employed to apply pressure to tanks 5 and 6. Instead of a compressed inert gas, pumps can be used for this purpose and on larger devices turbopumps can be employed driven by turbines supplied with hot gases from a separate gas generator.

The propellants enter reaction chamber 1 through an injector which can be of the impinging stream, multiple hole type, with or without a splash plate, or of the spray type. In the former, the propellants are separately injected through a number of separated holes in such a manner that the resulting propellant streams intersect each other and both will break up into small droplets. Spray type injectors give conical, cylindrical, or other types of spray sheets of propellant fluids, which intersect and thereby atomize and mix.

A glow plug, spark plug or flame lance can be provided for start-up. Since it is almost impossible to synchronize exactly the propellant feeds of a bipropellant system when starting the rocket engine, the oxygen flow is advantageously first initiated. The propellant valves can be controlled to operate in sequence and only partially opened until reaction is established at which time they are fully opened. After start-up, the flow ratio of oxygen to triboradimethyne is adjusted to be approximately stoichiometric for the reaction of all of the boron to $B_2O_3$, all of the hydrogen to water, and all of the carbon to carbon dioxide.

Liquid propellants mostly are reacted in the temperature range of 2000° F. to 4500° F. at pressures between 300 and 1500 p.s.i.a. The reaction pressure, as stated previously, can be controlled by the rate of flow of the propellants. For rocket engines designed for relatively long periods of sustained operating duration, the engine can be cooled, for example, by a regenerative cooling system using water or another relatively inert fluid as the coolant flowing through a jacket surrounding the reaction chamber.

We claim:

A method for preparing symmetrical triboradimethyne which comprises subjecting an admixture of pentaborane (9) and acetylene to a silent electric discharge and separating the symmetrical triboradimethyne from the reaction mixture.

References Cited in the file of this patent

Berichte, vol. 69B, pp. 1469–75 (1936).
Berichte, vol. 56, page 808 (1923).